United States Patent [19]

Lacroix

[11] 4,180,743

[45] Dec. 25, 1979

[54] INERTIA-ACTUATED STARTER FOR AN EXPLOSION ENGINE

[75] Inventor: Bernard Lacroix, Montbeliard, France

[73] Assignee: Cycles Peugeot, Valentigney, France

[21] Appl. No.: 904,118

[22] Filed: May 8, 1978

[30] Foreign Application Priority Data

May 12, 1977 [FR] France ............................... 77 14543

[51] Int. Cl.[2] ............................................... H02K 7/00

[52] U.S. Cl. ................................ 290/38 B; 790/38 C; 790/48 X; 310/74; 310/78; 310/268

[58] Field of Search ................. 790/38 R, 38 A, 38 B, 790/48 R; 320/79, 75–78, 268, 191, 209

[56] References Cited

U.S. PATENT DOCUMENTS

| | | | |
|---|---|---|---|
| 1,171,948 | 2/1916 | Hassler | 310/78 |
| 1,511,491 | 10/1924 | Aspden | 290/38 B |
| 1,511,492 | 10/1924 | Aspden | 290/38 B |
| 1,926,029 | 9/1933 | Bowes | 290/38 B |
| 1,946,513 | 2/1934 | Webster et al. | 310/78 |
| 2,302,013 | 11/1942 | Farkas et al. | 310/268 X |
| 3,619,676 | 11/1971 | Kawakami et al. | 310/209 X |

*Primary Examiner*—Donovan F. Duggan
*Attorney, Agent, or Firm*—Sughrue, Rothwell, Mion, Zinn and Macpeak

[57] ABSTRACT

The starter comprises a flywheel rotated by an electric motor and an electromagnetic clutch for rendering the flywheel rigid with the crankshaft of the engine to be started. The flywheel carries on one side the armature of the motor and on the opposite side the inductor of the clutch. The motor inductor is carried by a flat disc which is parallel to the flywheel and defines a planar airgap of the motor. The flywheel has a part which is common to the magnetic circuits of the motor armature and the clutch inductor and has sufficient section to permit the circulation of the motor or clutch magnetic flux but is saturated by the circulation of the flux of the motor so that a remanent flux of the clutch will be cancelled out as soon as the magnetic flux of the motor is produced.

6 Claims, 3 Drawing Figures

INERTIA-ACTUATED STARTER FOR AN EXPLOSION ENGINE

Figure 1:
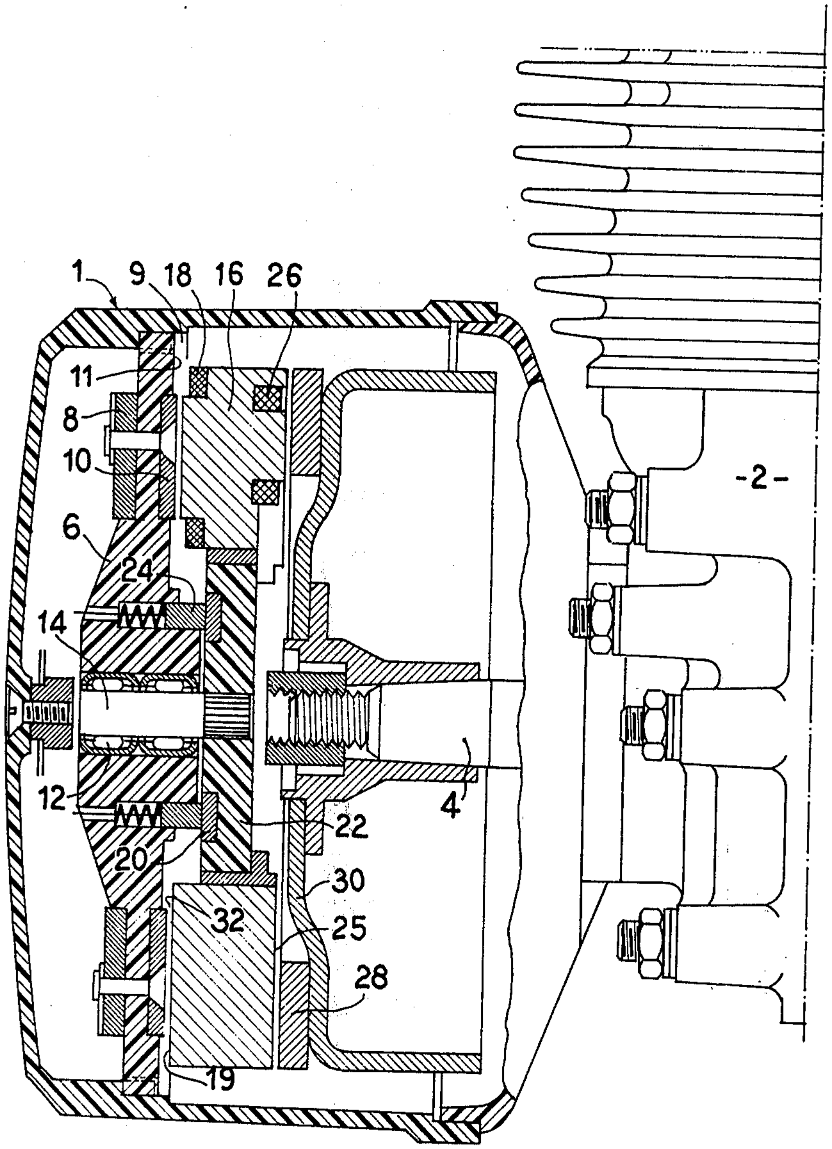

The present invention relates to an inertia-actuated starter of the type in which a flywheel is rotated by an electric motor and then connected by an electromagnetic clutch to rotate with the crankshaft of the engine to be started.

The electric motor employed for rotating the flywheel may have a relatively low power and yet be capable of accumulating in the flywheel sufficient kinetic energy within a few seconds to start an explosion engine. Moreover, the connection of the flywheel to the crankshaft is achieved in an effective manner by the electromagnetic clutch. However, inertia-actuated starters of this type often have a serious drawback residing in the tendency of the clutch to remain stuck after its supply of current has been cut off owing to a remanent magnetic field which maintains a certain force of attraction. When starting, the vibrations produced by the explosion engine when the latter starts are sufficient to produce the release of the electromagnetic clutch. On the other hand, if the engine does not start, the electromagnetic clutch will remain stuck and prevent a new starting operation.

In order to avoid this, it has been envisaged to employ mechanical or electric means but none of the proposed devices has been found satisfactory.

An object of the present invention is to overcome this drawback by providing an inertia-actuated starter of the aforementioned type wherein the release of the clutch occurs automatically as soon as the armature of the motor is supplied with current. According to the invention, there is provided an inertia-actuated starter wherein the flywheel carries on one of the sides thereof the armature of the motor and on the opposite side the inductor of the clutch. The inductor of the motor is mounted on a flat disc parallel to the flywheel.

With this arrangement, the magnetic flux of the motor and the magnetic flux of the clutch flow in the same part of the flywheel so that the magnetic flux of the motor can cancel out the remanent flux of the clutch. Thus it is possible to release the clutch whenever required by supplying current to the armature of the motor. The operation of the starter is then ensured.

The ensuing description of one embodiment, given by way of a non-limitative example and illustrated in the accompanying drawings, will bring out the advantages and features of the invention.

Figure 2:
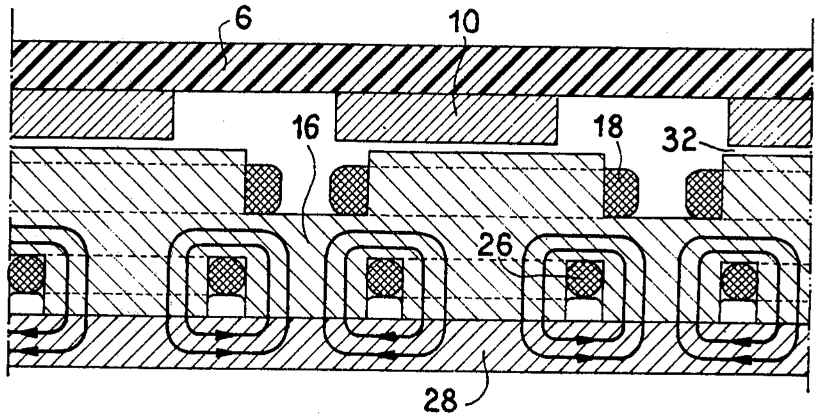
Figure 3:
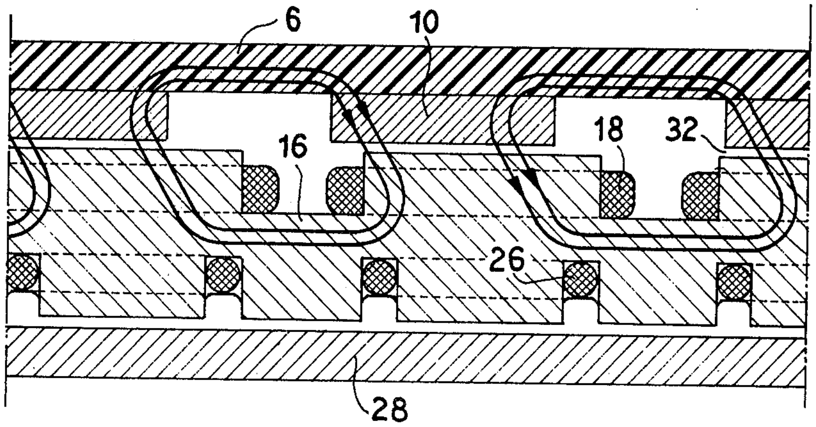

In the drawings:

FIG. 1 is a longitudinal sectional view of the starter according to the invention, and FIGS. 2 and 3 are partial diagrammatic developed cylindrical sectional views through the axes of the windings of the motor-clutch unit in the clutching position and in the position for rotating the flywheel respectively.

As shown in FIG. 1, the inertia-actuated starter of the invention is mounted within a case 1 which is secured to the engine 2 to be started, preferably an explosion engine, and through which extends the end of the crankshaft 4 of the engine. Mounted coaxially on the shaft 4 is a flat disc 6 of an insulating material which is maintained on its periphery in the case 1 since it is prevented from rotating relative to the latter by ribs which cooperate with grooves 9 in the case. The disc 6 carries induction or field windings 8 which are connected to an electric current generator (not shown) the pole pieces of which are formed by plates 10 carried by the side of the disc 6 facing the crankshaft 4. The inductor or field windings 8 may be replaced by permanent magnets. This disc 6 is mounted by ball or needle bearings 12 on a shaft 14 which is in alignment with but independent of the crankshaft 4. The disc 6 is axially rigid with the shaft 4 and with a flywheel 16 mounted on the shaft 14.

The flywheel 16 has a peripheral ring which supports the armature windings of the motor 18. The windings 18 are placed on the side 19 of the flywheel facing the pole plates 10 of the inductors so that the airgap of the electric motor for rotating the flywheel 16 is substantially flat. The armature windings 18 are connected to a commutator 20 which is carried by the hub 22 of the flywheel and cooperates with brushes 24 carried by the centre part of the disc 6.

On the side 25 opposed to the side 19 carrying the armature of the motor, the flywheel 16 carries windings 26 forming the inductor or field of an electromagnetic clutch. The armature 28 of this electromagnetic clutch is constituted by a disc of soft ferromagnetic material rigid with a magnetic flywheel 30 fixed to the end of the crankshaft 4. In the same way as the inductor 8 of the motor, the inductor 26 of the clutch is connected to the electric current generator which may be for example a light battery.

As clearly shown diagrammatically in FIGS. 2 and 3, the windings carried by the flywheel 16 are coaxial. Thus, each armature winding 18 of the motor is coaxial with an inductor winding of the clutch. On the other hand, the windings have different dimensions so that the spacing between two windings of the inductor of the clutch is larger than that between the two adjacent windings of the armature of the motor. Between the two windings, the flywheel is relatively thin. It is sufficient to permit the circulation of the magnetic flux, whether it be that of the motor or that of the clutch, but too thin not to be saturated by the passage of a single one of these fluxes.

When the engine 2 must be rotated, the inductor 8 and the armature 18 of the electric starter motor are supplied with current. As shown in FIG. 3, a magnetic flux is then created between the pole pieces 10 and the armature 18 and causes the flywheel 16 to be rotated. The latter accumulates within a few seconds sufficient kinetic energy to rotate the engine 2. The supply of current to the inductor of the motor 8 is then cut off whereas the inductor 26 carried by the flywheel 16 is supplied with current. This supply of current creates a new magnetic flux and causes the flywheel 16 to be attracted by the armature 28 of the clutch. As the flywheel 16 is axially rigid with the shaft 14 and the disc 6, it is the whole of the motor which slides in the grooves 9 of the case 1 and moves toward the armature 28. The airgap between the inductor 26 and the armature 28 is then closed as clearly shown in FIG. 2. The magnetic flux then travels through the path shown in FIG. 2. As in the case of the excitation of the inductor of the motor, the flux travels through the portion of the flywheel which is located between the two windings, that is to say between the armature 18 and the inductor 26.

The inductor 26 is ceased to be excitated as soon as the crankshaft 4 has assumed sufficient speed and the engine has started. At this moment, an elastic system biases the disc 6 to its position of operation, that is to say moves it away from the armature of the clutch 28. However, in many cases, a remanent flux remains between the armature 28 and the inductor winding 26 so that the flywheel 16 remains attracted against the armature 28 and prevents the return of the motor unit to its normal position.

If the engine starts normally, the vibrations produced by the latter will be sufficient to cause the release of the clutch and the return of the whole of the starter to its initial position.

On the other hand, if the engine does not start, it is the supply of current to the armature 18 at the start of the following operation for starting the engine which will produce the magnetic saturation of the sections of the magnetic circuit common to the armature 18 and the inductor 26. This magnetic saturation cancels out the remanent flux of the clutch and eliminates the residual attraction acting thereon.

The whole of the starter is therefore released and can operate normally.

It is clear furthermore that the use of a planar airgap between the armature and the inductor of the motor considerably reduces the overall size of the starter. There is consequently provided an inertia-actuated starter which is extremely reliable and rapid in operation and furthermore of small overall size.

Having now described my invention what I claim as new and desire to secure by Letters Patent is:

1. An inertia-actuated starter for starting an engine having a crankshaft, the starter comprising an electric motor having an armature and an inductor, a flywheel connected to be rotated by the electric motor, an electromagnetic clutch including an armature and an inductor for rendering the flywheel rigid with said crankshaft, the flywheel carrying on one side thereof the armature of the motor and on an opposite side thereof the inductor of the clutch, a flat disc parallel to the flywheel and carrying the inductor of the motor and defining a planar airgap of the motor, and the flywheel comprising a part which is common to the magnetic circuit of the armature of the motor and of the inductor of the clutch which has sufficient section to permit the circulation of the magnetic flux of the motor or of the clutch but which is saturated by the circulation of the flux of the motor so that a remanent flux of the clutch will be cancelled out instantaneously when the magnetic flux of the motor is produced.

2. A device as claimed in claim 1, wherein the disc carrying the inductor of the motor is axially rigid with the flywheel but is free to rotate relative to the flywheel.

3. A device as claimed in claim 1, wherein the flywheel is of a soft ferromagnetic material.

4. A device as claimed in claim 1, wherein the clutch comprises an annular armature which is of soft ferromagnetic material and is for rigidly fixing to said crankshaft.

5. A device as claimed in claim 1, wherein the armature of the motor and the inductor of the clutch have windings which are coaxial and located on opposite sides of the flywheel.

6. A device as claimed in claim 1, comprising elastically yieldable means for returning the disc and the flywheel to a position spaced away from the armature of the clutch.

* * * * *